(12) United States Patent
Koshiishi et al.

(10) Patent No.: US 8,922,893 B2
(45) Date of Patent: Dec. 30, 2014

(54) OPTICAL ELEMENT, METHOD OF FORMING OPTICAL ELEMENT, OPTICAL ELEMENT ARRAY, DISPLAY DEVICE, AND ELECTRONIC APPARATUS

(75) Inventors: Ryo Koshiishi, Kanagawa (JP); Yuichi Takai, Tokyo (JP); Hiroyuki Nagai, Tokyo (JP)

(73) Assignee: Sony Corporation, Tokyo (JP)

( * ) Notice: Subject to any disclaimer, the term of this patent is extended or adjusted under 35 U.S.C. 154(b) by 62 days.

(21) Appl. No.: 13/594,495

(22) Filed: Aug. 24, 2012

(65) Prior Publication Data

US 2013/0057960 A1    Mar. 7, 2013

(30) Foreign Application Priority Data

Sep. 5, 2011   (JP) ................... 2011-193268

(51) Int. Cl.
| | |
|---|---|
| *G02B 27/10* | (2006.01) |
| *G02B 3/14* | (2006.01) |
| *G02B 27/22* | (2006.01) |
| *G02B 26/00* | (2006.01) |

(52) U.S. Cl.
CPC .............. *G02B 3/14* (2013.01); *G02B 27/2214* (2013.01); *G02B 26/005* (2013.01)
USPC .......................................... 359/619; 359/666

(58) Field of Classification Search
CPC .................................. G02B 1/06; G02B 27/10
USPC .......................................... 359/665, 666, 619
See application file for complete search history.

(56) References Cited

U.S. PATENT DOCUMENTS

| | | | |
|---|---|---|---|
| 2011/0286073 A1* | 11/2011 | Lo et al. ................. | 359/290 |
| 2011/0299171 A1* | 12/2011 | Sato et al. .............. | 359/619 |
| 2013/0215095 A1* | 8/2013 | Shin et al. .............. | 345/212 |

FOREIGN PATENT DOCUMENTS

JP         2009-247480        10/2009

* cited by examiner

*Primary Examiner* — James Jones
(74) *Attorney, Agent, or Firm* — K&L Gates LLP

(57) ABSTRACT

There is provided an optical element including first and second substrates that are disposed to face each other; a pair of wall portions that are erected on an inner surface of the first substrate facing the second substrate to be adjacent to each other in a first direction and extend in a second direction different from the first direction; first and second electrodes that are disposed on wall surfaces of the pair of wall portions to be insulated from each other and face each other and are provided to be apart from the first substrate; an insulating film that covers the first and second electrodes; a third electrode that is provided on an inner surface of the second substrate facing the first substrate; and a polar liquid and a non-polar liquid that are sealed between the first substrate and the second substrate and have different refractive indexes.

14 Claims, 17 Drawing Sheets

FIG.7
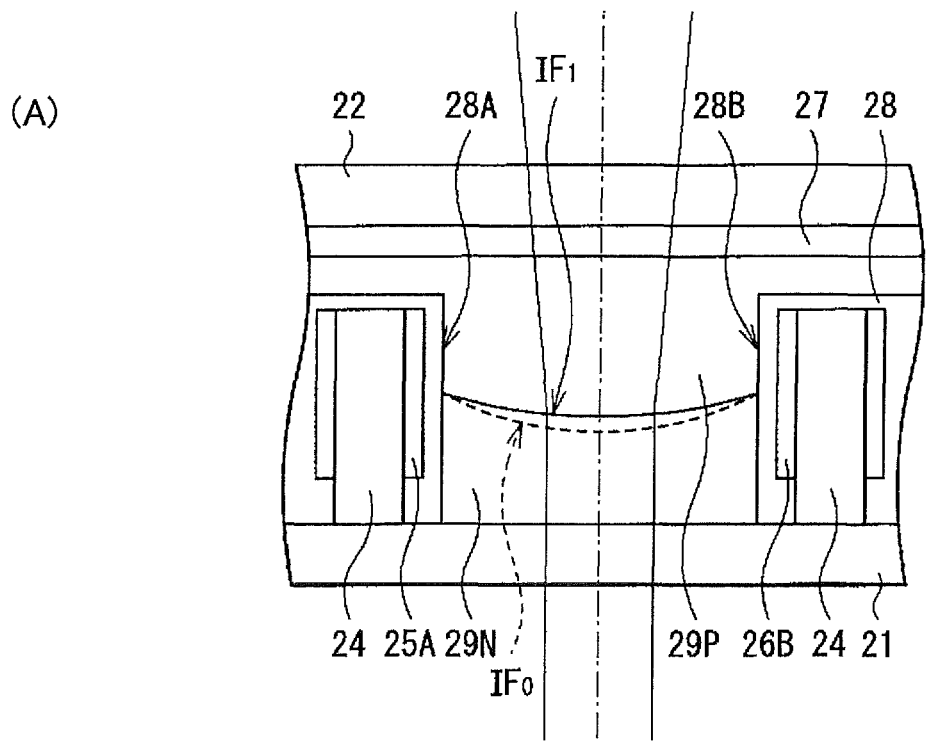
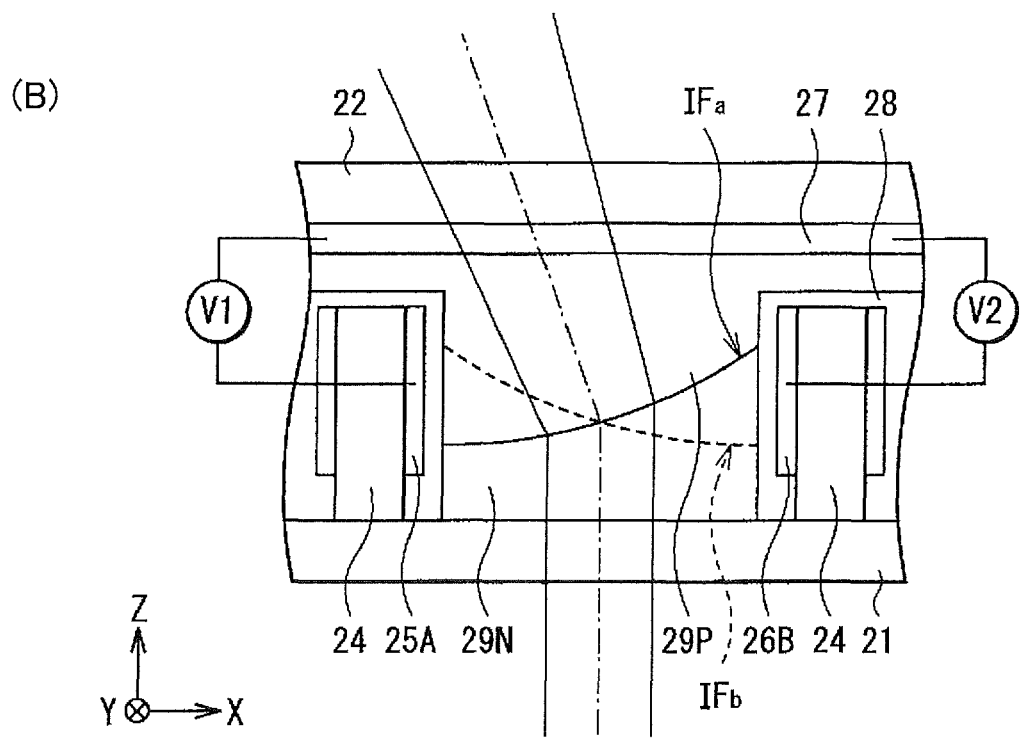

OPTICAL ELEMENT, METHOD OF FORMING OPTICAL ELEMENT, OPTICAL ELEMENT ARRAY, DISPLAY DEVICE, AND ELECTRONIC APPARATUS

CROSS REFERENCES TO RELATED APPLICATIONS

The present application claims priority to Japanese Priority Patent Application JP 2011-193268 filed in the Japan Patent Office on Sep. 5, 2011, the entire content of which is hereby incorporated by reference.

BACKGROUND

The present disclosure relates to an optical element and an optical element array using an electro-wetting phenomenon, a display device and an electronic apparatus including the optical element and the optical element array, and a method of forming the optical element.

In the related art, a liquid optical element that shows an optical action by an electro-wetting phenomenon (electrocapillary phenomenon) has been developed. The electro-wetting phenomenon is a phenomenon in which, when a voltage is applied between an electrode and a conductive liquid (polar liquid), interface energy of a surface of the electrode and the liquid changes and a surface shape of the liquid changes.

The present applicant has suggested a stereoscopic image display device that includes a plurality of liquid optical elements using the electro-wetting phenomenon as lenticular lenses (for example, Japanese Patent Application Publication No. 2009-247480).

SUMMARY

In general, because the liquid optical element uses the electro-wetting phenomenon, the surface of the electrode is covered with a water-repellent insulating film. In the insulating film, it is demanded to secure a desired insulating property (sufficiently suppress a leak current) and obtain a desired contact angle in the polar liquid.

In recent years, a demand to drive the liquid optical element with a low application voltage has arisen. For this reason, increasing permittivity of the insulating film and decreasing the thickness of the insulating film have been considered. However, it becomes difficult to thinly and uniformly form the insulating film covering the electrode with a liquid optical element having a small size.

The present disclosure has been made in view of the above-described problems and it is a first object of the present disclosure to provide an optical element and an optical element array, and a display device and an electronic apparatus including the optical element and the optical element array in which an operation can be accurately performed while a sufficient insulating property can be secured. In addition, it is a second object of the present disclosure to provide a method of forming the optical element.

An optical element of the present disclosure includes first and second substrates that are disposed to face each other, a pair of wall portions that are erected on an inner surface of the first substrate facing the second substrate to be adjacent to each other in a first direction and extend in a second direction different from the first direction, first and second electrodes that are disposed on wall surfaces of the pair of wall portions to be insulated from each other and face each other and are provided to be apart from the first substrate, an insulating film that covers the first and second electrodes, a third electrode that is provided on an inner surface of the second substrate facing the first substrate, and a polar liquid and a non-polar liquid that are sealed between the first substrate and the second substrate and have different refractive indexes.

An optical element array of the present disclosure includes first and second substrates that are disposed to face each other, partition walls that are erected on an inner surface of the first substrate facing the second substrate and extend in a second direction different from a first direction, such that a region on the first substrate is divided for each of a plurality of optical elements arranged in the first direction, first and second electrodes that are disposed on wall surfaces of the partition walls to be insulated from each other and face each other and are provided to be apart from the first substrate, an insulating film that covers the first and second electrodes, a third electrode that is provided on an inner surface of the second substrate facing the first substrate, and a polar liquid and a non-polar liquid that are sealed between the first substrate and the third substrate and have different refractive indexes.

A display device of the present disclosure includes a display unit and the optical element array described above. An electronic apparatus of the present disclosure includes the display device. The display unit is a display that has a plurality of pixels and generates a two-dimensional display image according to a video signal.

A method of forming an optical element of the present disclosure includes forming a pair of wall portions erected to be adjacent to each other in a first direction and extending in a second direction different from the first direction, on a surface of a first substrate, forming a resist layer to continuously cover wall surfaces of the wall portions and a surface of the first substrate, selectively removing a portion covering a region apart from the surface of the first substrate, of the resist layer covering the wall surfaces of the wall portions, removing the other portion of the remaining resist layer after forming facing first and second electrodes to cover regions in which the resist layer is removed in the wall surfaces of the wall portions, forming an insulating film to cover the first and second electrodes, arranging a second substrate of which one surface is provided with a third electrode, such that the third electrode faces the first substrate, and sealing a polar liquid and a non-polar liquid having different refractive indexes, between the first substrate and the second substrate.

In the optical element, the optical element array, the display device, the electronic apparatus, and the method of forming an optical element in the present disclosure, the first and second electrodes are provided on the wall surfaces of the partition walls (wall portions) to be apart from the surface of the first substrate serving as the bottom surfaces of the plurality of element regions. Thereby, as compared with the case in which the first and second electrodes are formed to contact the surface of the first substrate, the change in the thickness of the insulating film that covers the first and second electrodes is decreased. This is because the material for forming the insulating film is seldom attached to the first and second electrodes in corner portions in which the partition walls (wall portions) and the surface of the first substrate cross when the first and second electrodes are formed to contact the surface of the first substrate.

According to the embodiments of the present disclosure described above, in the optical element and the optical element array, because the change in the thickness of the insulating film covering the first and second electrodes is decreased, accurate driving can be realized with a low voltage while a sufficient insulating property is secured, even when the thickness is small. For this reason, according to the display device and the electronic apparatus of the present disclosure including the optical element array, accurate image display corresponding to a predetermined video signal can be realized while consumption power is decreased. In the method of forming the optical element in the present disclosure, because a mask is not used, a manufacturing error due to an alignment error can be avoided. Therefore, even when the first substrate and the wall portions are formed of resin having a large dimension change due to the temperature change, the optical element can be formed with high dimension accuracy.

Additional features and advantages are described herein, and will be apparent from the following Detailed Description and the figures.

BRIEF DESCRIPTION OF THE FIGURES

FIGS. 7A and 7B are other conceptual diagrams showing an operation of the liquid optical element shown in FIG. 3;

DETAILED DESCRIPTION

Figure 1:
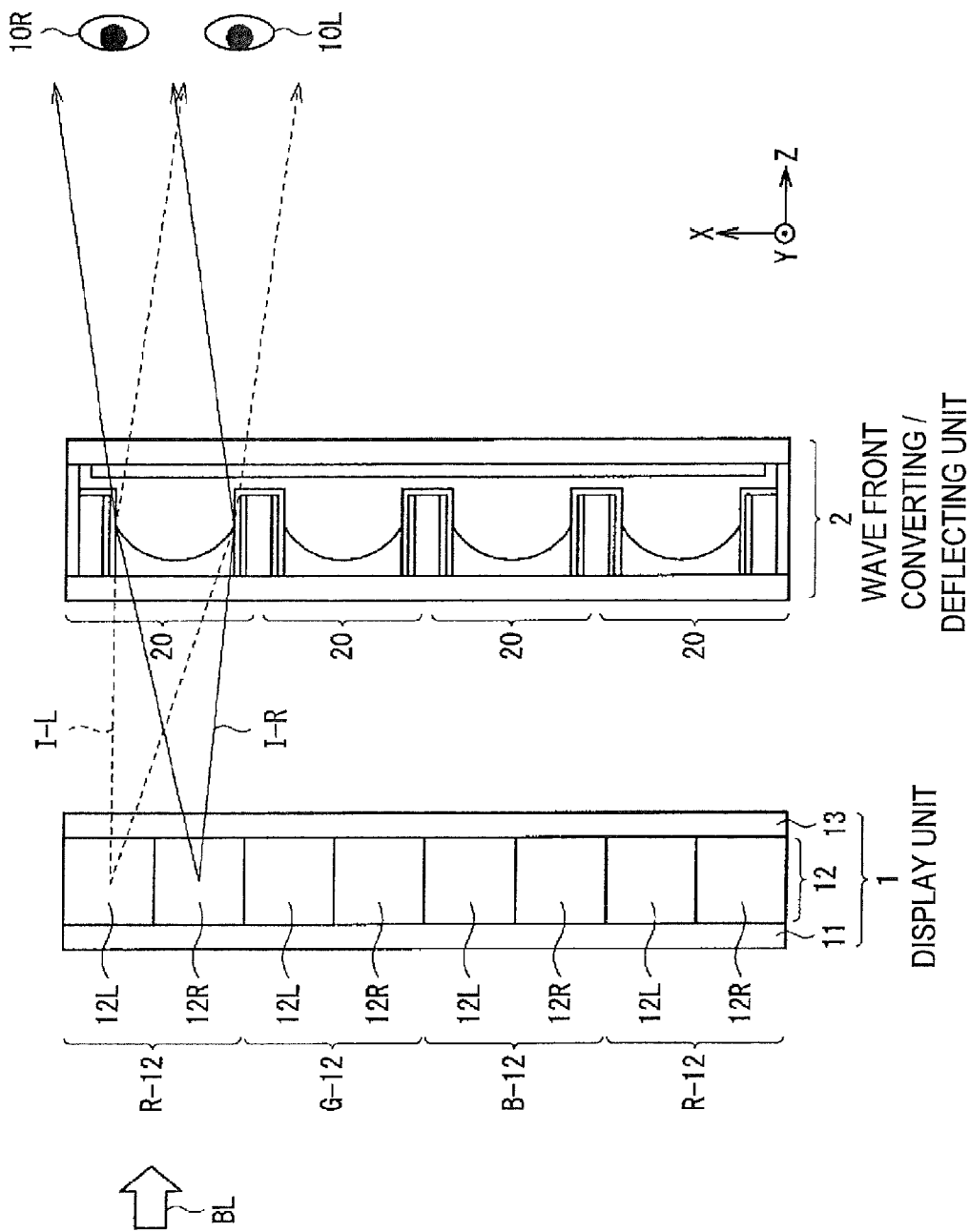
FIG. 1 is a schematic diagram showing a configuration of a stereoscopic display device according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, preferred embodiments of the present disclosure will be described in detail with reference to the appended drawings. The following description will be made in the order described below.

1. Embodiment (FIGS. 1 to 14): Stereoscopic Display Device

2. Application Example (FIG. 15): Application Example of Display Device (Electronic Apparatus)

<Configuration of Stereoscopic Display Device>

First, a stereoscopic display device using a liquid optical element array according to an embodiment of the present disclosure will be described with reference to FIG. 1. FIG. 1 is a schematic diagram showing an example of a planar configuration of the stereoscopic display device according to this embodiment.

As shown in FIG. 1, the stereoscopic display device includes a display unit 1 having a plurality of pixels 12 and a wave front converting/deflecting unit 2 functioning as a liquid optical element array, sequentially from the side of a light source (not shown in the drawings). In this case, an advancing direction of light from the light source is set to a Z-axis direction, a horizontal direction is set to an X-axis direction, and a vertical direction is set to a Y-axis direction.

The display unit 1 generates a two-dimensional display image according to a video signal. For example, the display unit 1 is a color liquid crystal display that emits display image light by irradiation of light from a backlight BL. The display unit 1 has a configuration in which a glass substrate 11, the plurality of pixels 12 (12L and 12R) including pixel electrodes and liquid crystal layers, and a glass substrate 13 are stacked sequentially from the side of the light source. The glass substrate 11 and the glass substrate 13 are transparent substrates and color filters having colored layers of red (R), green (G), and blue (B) are provided in any one of the glass substrate 11 and the glass substrate 13. For this reason, the pixels 12 are classified into pixels R-12 to display the color red, pixels G-12 to display the color green, and pixels B-12 to display the color blue. In the display unit 1, the pixel R-12, the pixel G-12, and the pixel B-12 are sequentially and repetitively arranged in the X-axis direction and the pixels 12 of the same colors are arranged in the Y-axis direction. The pixels 12 are classified into the pixels emitting display image light to form an image for a left eye and the pixels emitting display image light to form an image for a right eye and the classified pixels are alternately arranged in the X-axis direction. In FIG. 1, the pixels 12 that emit the display image light to form the image for the left eye are displayed as pixels 12L and the pixels 12 that emit the display image light to form the image for the right eye are displayed as pixels 12R.

The wave front converting/deflecting unit 2 has an array shape in which a plurality of liquid optical elements 20 each provided to correspond to a set of pixels 12L and 12R adjacent to each other in the X-axis direction are arranged in the X-axis direction. The wave front converting/deflecting unit 2 executes wave front conversion processing and deflection processing with respect to the display image light emitted from the display unit 1. Specifically, in the wave front converting/deflecting unit 2, each liquid optical element 21 that corresponds to each pixel 12 functions as a cylindrical lens. That is, the wave front converting/deflecting unit 2 functions as a lenticular lens as a whole. Thereby, wave fronts of the display image light from the pixels 12L and 12R are collectively converted into wave fronts having the constant curvature in a unit of a group of pixels 12 arranged in the vertical direction (Y-axis direction). In the wave front converting/ deflecting unit 2, the display image light can be collectively deflected in a horizontal plane (XZ plane), according to necessity.

A specific configuration of the wave front converting/deflecting unit 2 will be described with reference to FIGS. 2 to 4.

Figure 2:
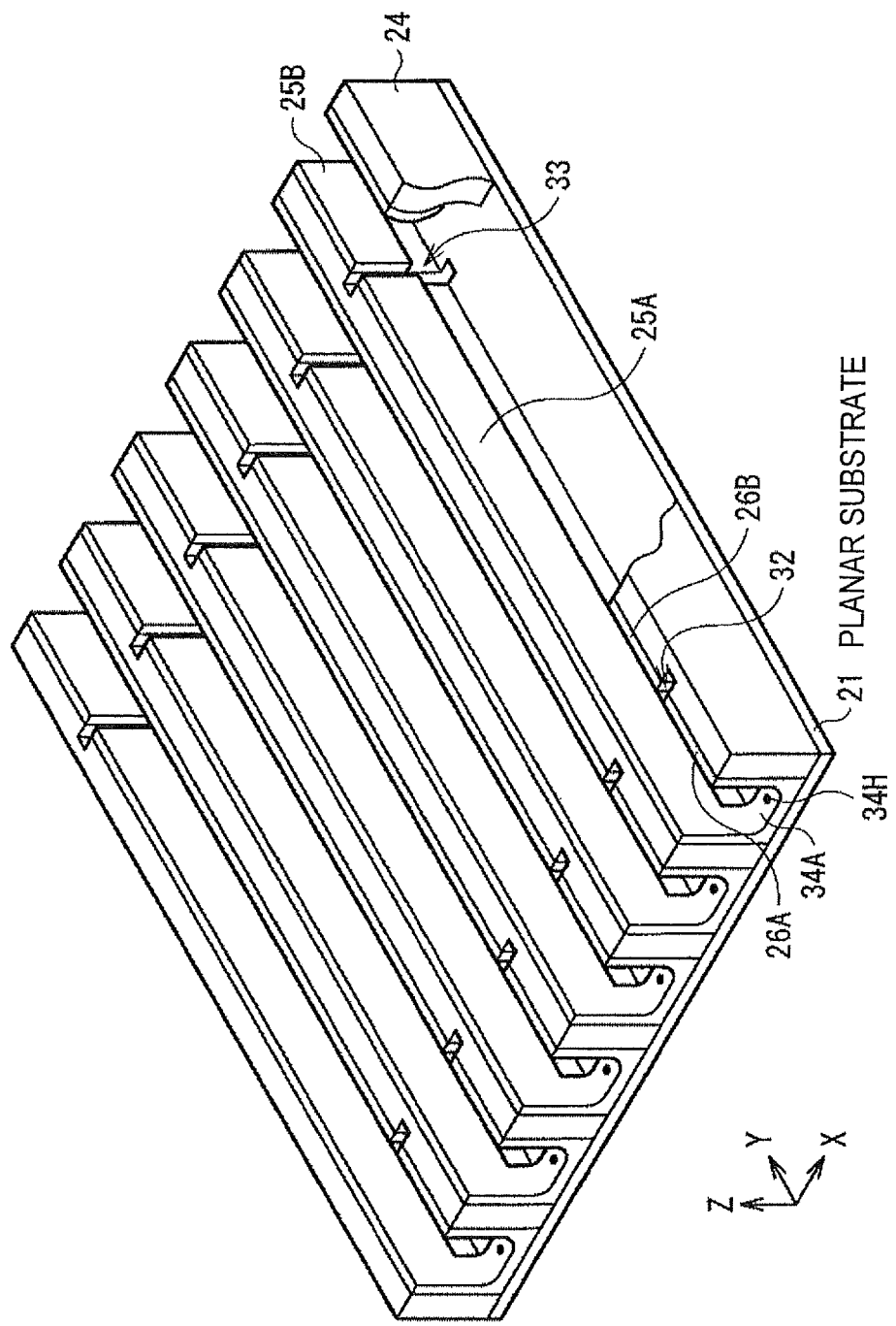
FIG. 2 is a perspective view showing a configuration of a main portion of a wave front converting/deflecting unit shown in FIG. 1.

FIG. 2 is a perspective view showing a main portion of the wave front converting/deflecting unit 2. FIG. 3 is a plan view of the wave front converting/deflecting unit 2 viewed from an advancing direction of the display image light in the XY plane. FIG. 4 is a cross-sectional view of an arrow direction taken along line IV-IV shown in FIG. 3. FIG. 5 is a cross-sectional view of an arrow direction taken along line V-V shown in FIG. 3.

Figure 3:
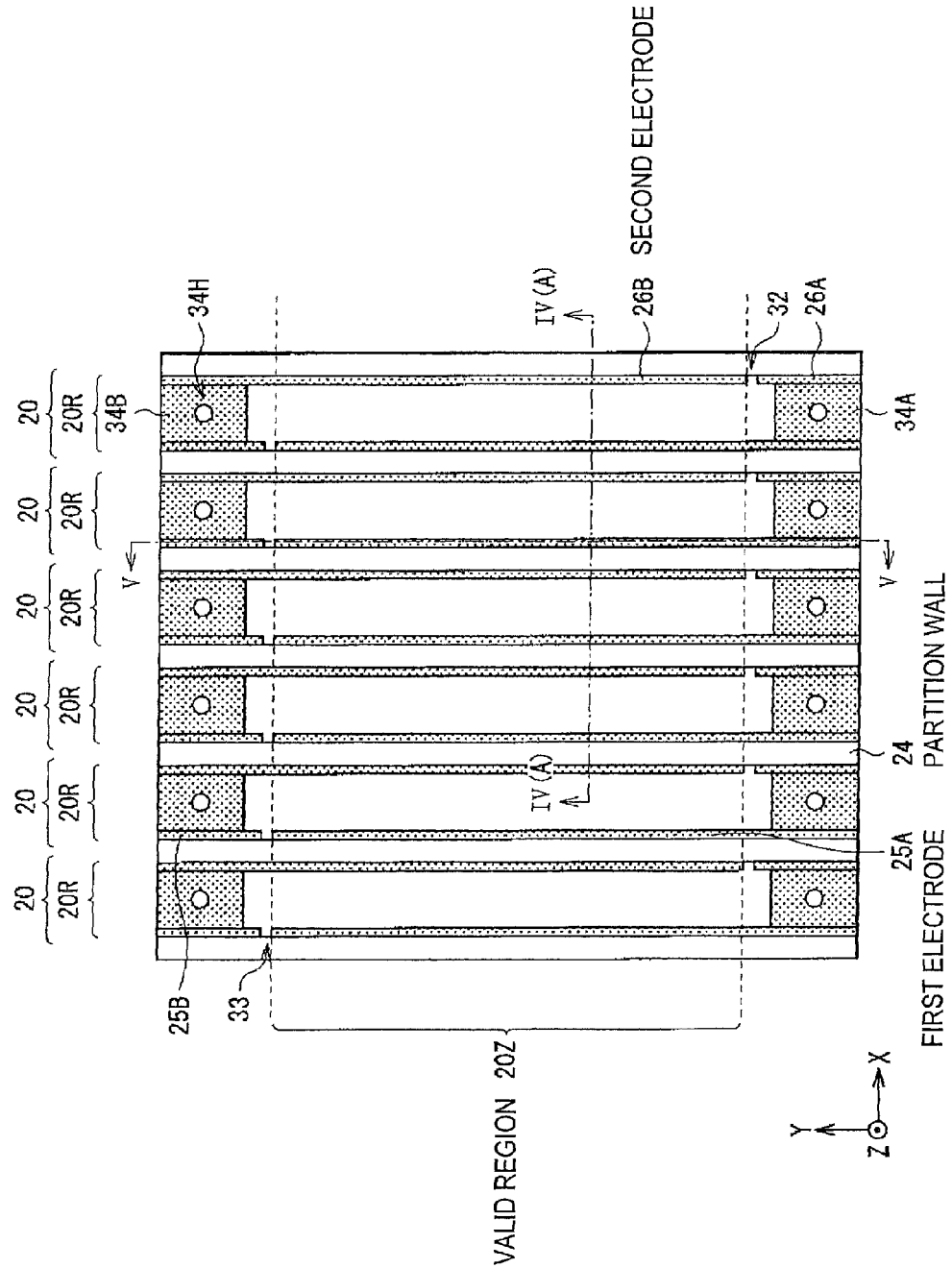
FIG. 3 is a plan view showing a configuration of a main portion of the wave front converting/deflecting unit shown in FIG. 1.

As shown in FIGS. 2 to 5, the wave front converting/deflecting unit 2 includes a pair of planar substrates 21 and 22 that are disposed to face each other and sidewalls 23 and partition walls 24 that are erected on an inner surface 21S of the planar substrate 21 facing the planar substrate 22 and support the planar substrate 22 through an adhesive layer 31. In the wave front converting/deflecting unit 2, the plurality of liquid optical elements 20 that are divided by the plurality of partition walls 24 extending in the Y-axis direction are arranged in the X-axis direction and form a liquid optical element array as a whole. The liquid optical element 20 includes two kinds of liquids (a polar liquid 29P and a non-polar liquid 29N) that have different refractive indexes and cause optical actions (that is, a wave front conversion action and a deflection action) such as deflection and refraction with respect to incident light. In FIGS. 2 and 3, an insulating film 28 (to be described below) and a third electrode 27 (to be described below), in addition to the adhesive layer 31, the sidewall 23, the planar substrate 22, the polar liquid 29P, and the non-polar liquid 29N, are not shown in the drawings.

The planar substrates 21 and 22 are formed of a transparent insulating material such as glass or transparent plastic that transmits visible light. On the inner surface 21S of the planar substrate 21, the plurality of partition walls 24 that partition a space region on the planar substrate 21 for each of the plurality of liquid optical elements 20 are erected. That is, the liquid optical element 20 is provided for each element region 20R to be a space interposed between the partition walls 24 adjacent to each other. Because the plurality of sidewalls 24 extend in the Y-axis direction, the liquid optical element 20 (element region 20R) has a rectangular planar shape to correspond to a group of display pixels 12 arranged in the Y-axis direction. In each element region 20R, the non-polar liquid 29N is held. That is, the non-polar liquid 29N does not move (flow) to the adjacent element regions 20R because the partition wall 24 is provided. The partition wall 24 is preferably formed of a material not dissolving in the polar liquid 29P and the non-polar liquid 29N, for example, an epoxy resin or acrylic resin. The planar substrate 21 and the partition wall 24 may be formed of the same kind of transparent plastic material and may be integrally molded. The partition wall 24 is preferably covered with a protective layer 35 (refer to FIG. 4). This is to alleviate damage received when the first and second electrodes 25 and 26 to be described below are formed and improve adhesion with the first and second electrodes 25 and 26. In FIG. 4, the protective layer 35 is provided to cover entire surfaces of a wall surface 24S and a top surface 24T of the partition wall 24 and the inner surface 21S of the planar substrate 21. However, the protective layer 35 may be provided at least between the wall surface 24S and the first and second electrodes 25 and 26. In FIGS. 1 to 3 and 5, and FIGS. 6 and 7 to be described below, the protective layer 35 is not shown. As the protective layer 35, a protective layer that is resistant to reactive ion etching, does not dissolve in an organic solvent, and has superior adhesion with the first and second electrodes 25 and 26 is preferable. A material for forming the protective layer includes at least one of silicon oxide ($SiO_x$), silicon nitride ($SiO_xN_y$), aluminum oxide ($Al_2O_3$), and tantalum oxide ($Ta_2O_5$).

On the wall surface 24S of each partition wall 24, the first and second electrodes 25 and 26 that are arranged to face each other are provided through the protective layer 35. As a material for forming the first and second electrodes 25 and 26, a transparent conductive material such as indium tin oxide (ITO) or zinc oxide (ZnO), a metal material such as copper (Cu), and another conductive material such as carbon (C) or a conductive polymer can be applied. The first and second electrodes 25 and 26 have a band shape and are formed continuously from one end of the partition wall 24 to the other end thereof in the Y-axis direction, except for separating portions 32 and 33. That is, the first electrode 25 is separated into two portions 25A and 25B in the separating portion 32. The second electrode 26 is separated into two portions 26A and 26B in the separating portion 33. In the following description, the portions 25A and 25B are described as the first electrodes 25A and 25B and the portions 26A and 26B are described as the second electrodes 26A and 26B. The separating portions 32 and 33 are formed by laser beam irradiation and are recess portions that are formed by removing parts of the surfaces of the partition wall 24 and the planar substrate 21. The separating portion 32 is provided near one end of the partition wall 24 in the Y-axis direction and the separating portion 33 is provided near the other end of the partition wall 24 in the Y-axis direction. Of the element region 20R, a region between the separating portion 32 and the separating portion 33, that is, an overlapping region (facing region) of the first electrode 25A and the second electrode 26B, becomes a valid region 20Z. The valid region 20Z is a region in which the wave front conversion processing and the deflection processing can be executed with respect to the display image light emitted from the display unit 1.

The first and second electrodes 25 and 26 do not cover the entire wall surface of the partition wall 24 and are not provided in a lower portion of the wall surface, that is, a surrounding portion of the planar substrate 21. For this reason, the first and second electrodes 25 and 26 do not contact the planar substrate 21 and are provided to be separated. In both ends of each element region 20R in the Y-axis direction, connecting portions 34 (34A and 34B) are provided to cover the surface of the planar substrate 21 and the lower portion of the wall surface of the partition wall 24. In the connecting portions 34A and 34B, silver pastes 34H that are formed by a screen printing method are provided and are connected to a conductive wire of an external power supply such that a voltage can be supplied. Therefore, the connecting portion 33A and the first electrode 25A and the second electrode 26A contacting the connecting portion 33A enter a conductive state. Likewise, the connecting portion 33B and the first electrode 25B and the second electrode 26B contacting the connecting portion 33B enter a conductive state. The potentials of the first and second electrodes 25 and 26 can be set to the predetermined potentials, by a control unit (not shown in the drawings) provided on a back surface of the planar substrate 21.

The first and second electrodes 25 and 26 are covered tightly by the insulating film 28. The insulating film 28 may be formed to completely cover the first and second electrodes 25 and 26, the partition wall 24 and the planar substrate 21. The insulating film 28 is formed of a material that shows a hydrophobic property (water-repellent property) (in a strict sense, shows an affinity for the non-polar liquid 29N in an electric field non-application state) with respect to the polar liquid 29P and has a superior electrical insulating property. Specifically, a fluorine polymer such as polyvinylidene fluoride (PVdF) or polytetrafluoroethylene (PTFE) or silicon may be used. However, in order to improve an electrical insulating property of the first and second electrodes 25 and 26, another insulating film formed of spin on glass (SOG) may be provided between the first and second electrodes 25 and 26 and the insulating film 28. An upper end of the partition wall 24 or the insulating film 28 covering the partition wall is preferably apart from the planar substrate 22 and the third electrode 27.

On the inner surface 22S of the planar substrate 22 that faces the planar substrate 21, the third electrode 27 is provided. The third electrode 27 is formed of a transparent conductive material such as ITO, ZnO, AZO, GZO, and TZO and functions as a ground electrode.

In the space region that is closed completely by the pair of planar substrates 21 and 22 and the partition walls 24, the non-polar liquid 29N and the polar liquid 29P are sealed. The non-polar liquid 29N and the polar liquid 29P do not dissolve in the closed space, are separated from each other, and form an interface IF. Because the non-polar liquid 29N and the polar liquid 29P are transparent, light that is transmitted through the interface IF is refracted according to an incident angle thereof and refractive indexes of the non-polar liquid 29N and the polar liquid 29P.

The non-polar liquid 29N is a liquid material that has little polarity and has an electrical insulating property. For example, the non-polar liquid 29N is preferably made of a hydrocarbon material such as decane, dodecane, hexadecane or undecane and silicone oil. The non-polar liquid 29N preferably has a capacity sufficient to completely cover the surface of the planar substrate 21 (or the insulating film 28 to cover the planar substrate), when a voltage is not applied between the first electrode 25A and the second electrode 26B.

Meanwhile, the polar liquid 29P is made of a liquid material having polarity. For example, the polar liquid 29P is preferably made of water and aqueous solutions in which electrolytes such as potassium chloride or sodium chloride are dissolved. If the voltage is applied to the polar liquid 29P, wettability with respect to facing inner surfaces 28A and 28B in the element region 20R (contact angle of the polar liquid 29P and the inner surfaces 28A and 28B) changes greatly as compared with the non-polar liquid 29N. The polar liquid 29P contacts the third electrode 27 functioning as the ground electrode.

In this case, an interval of the partition walls 24 arranged in the X-axis direction (in a strict sense, an interval W1 (refer to FIGS. 3 and 4) between the insulating films 28 covering the partition walls 24 adjacent to each other in the X-axis direction) may be a length equal to or less than the capillary length $K^{-1}$ represented by the following equation 1. In this way, the non-polar liquid 29N and the polar liquid 29P are stably held at an initial position (a position shown in FIG. 4). This is because the non-polar liquid 29N and the polar liquid 29P contact the insulating film 28 covering the partition wall 24 and the interface tension in the contact interface acts on the non-polar liquid 29N and the polar liquid 29P. In this case, the capillary length $K^{-1}$ shows the maximum length in which an influence of the gravity can be completely ignored with respect to the interface tension generated at the interface of the non-polar liquid 29N and the polar liquid 29P.

$$K^{-1} = \{\Delta\gamma/(\Delta\rho \times g)\}^{0.5} \quad (1)$$

wherein $K^{-1}$: capillary length (mm), $\Delta\gamma$: interface tension (mN/m) of the polar liquid and the non-polar liquid, $\Delta\rho$: density difference of the polar liquid and the non-polar liquid, and g: gravity acceleration (m/s$^2$)

Figure 4:
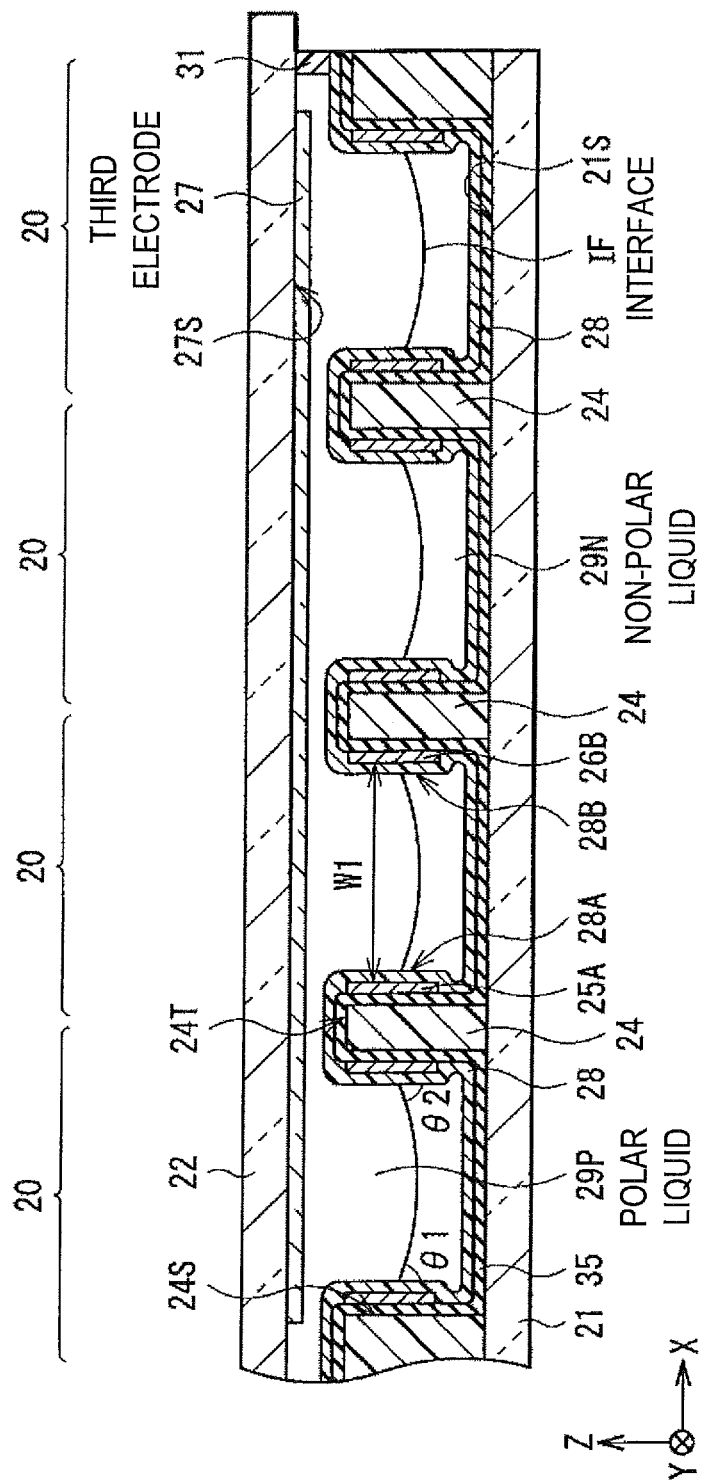
FIG. 4 is a cross-sectional view of a wave front converting/deflecting unit shown in FIG. 3 taken along line IV-IV.
Figure 5:
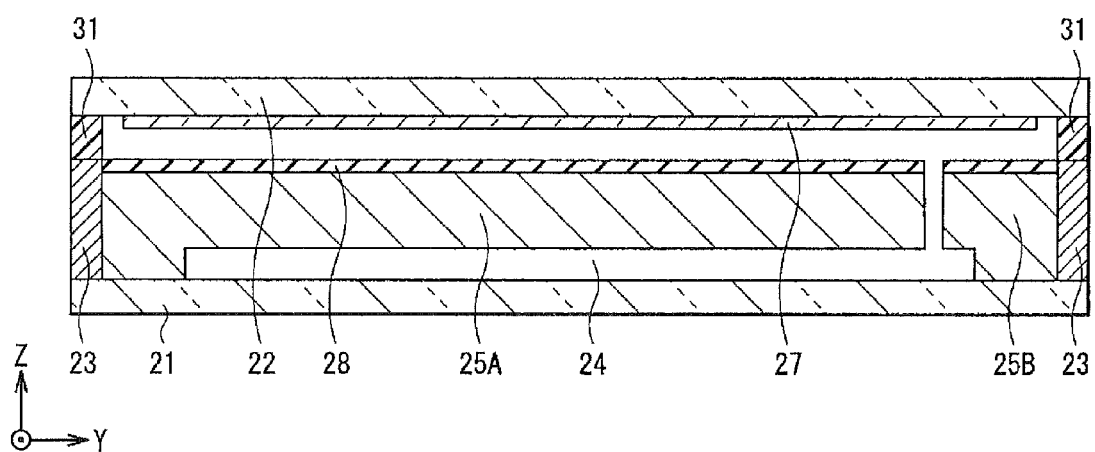
FIG. 5 is a cross-sectional view of a wave front converting/deflecting unit shown in FIG. 3 taken along line V-V.
Figure 6:
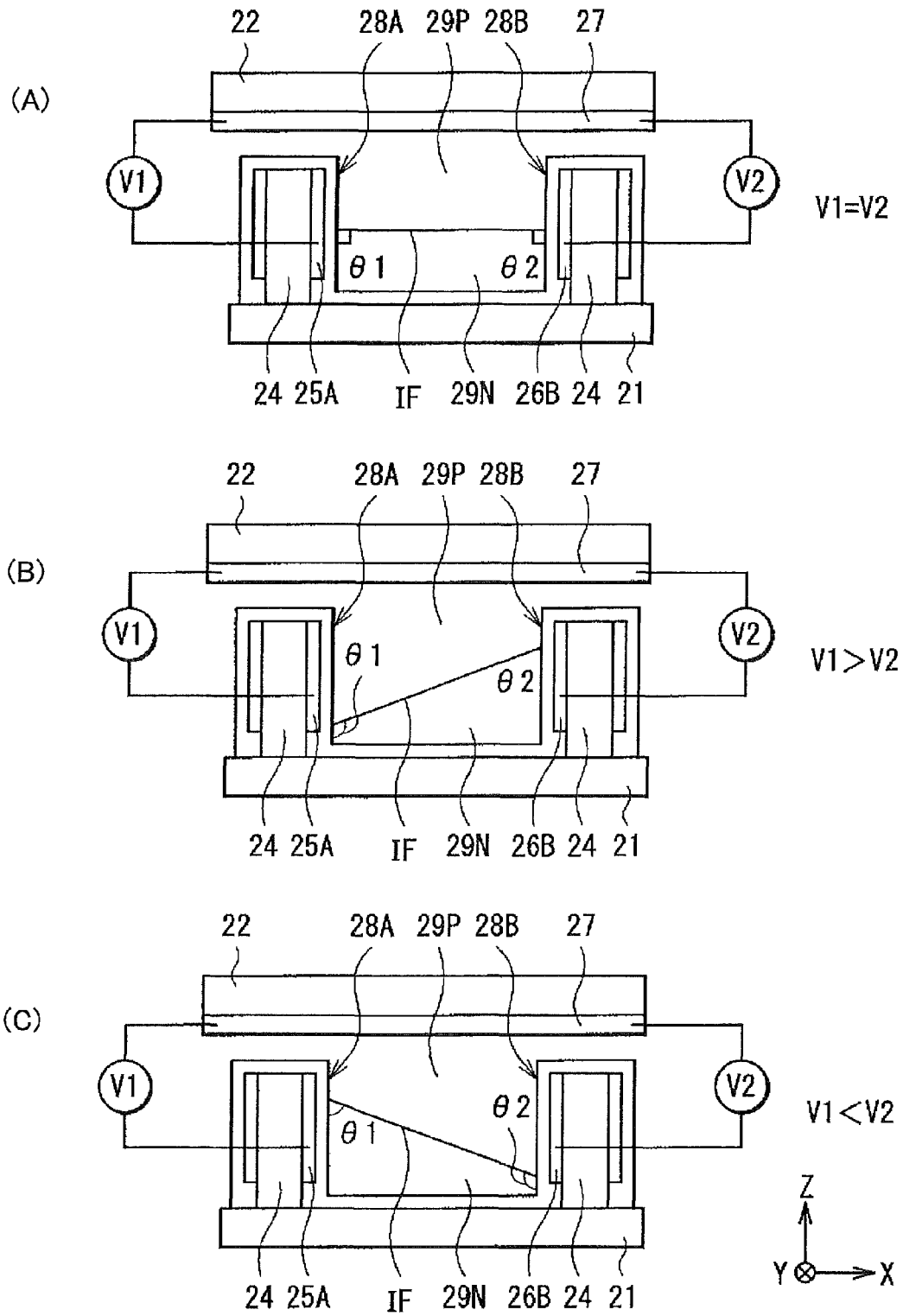
FIGS. 6A to 6C are conceptual diagrams showing an operation of a liquid optical element shown in FIG. 3.

In each liquid optical element 20, in a state in which the voltage is not applied between the first and second electrodes 25 and 26 (a state in which the potentials of the first and second electrodes 25 and 26 are zero), the interface IF has a convex surface from the side of the polar liquid 29P to the non-polar liquid 29N, as shown in FIG. 4. At this time, the curvature of the interface IF is constant in the Y-axis direction and each liquid optical element 20 functions as one cylindrical lens. The curvature of the interface IF is maximized in the state described above (the state in which the voltage is not applied between the first and second electrodes 25 and 26). A contact angle θ1 of the non-polar liquid 29N with respect to the inner surface 28A and a contact angle θ2 of the non-polar liquid 29N with respect to the inner surface 28B can be adjusted by selecting a kind of a material of the insulating film 28. In this case, if the non-polar liquid 29N has a refractive index more than a refractive index of the polar liquid 29P, the liquid optical element 20 shows negative refractive power. Meanwhile, if the non-polar liquid 29N has a refractive index less than a refractive index of the polar liquid 29P, the liquid optical element 20 shows positive refractive power. For example, if the non-polar liquid 29N is made of the hydrocarbon material or the silicone oil and the polar liquid 29P is made of the water or the electrolytic aqueous solution, the liquid optical element 20 shows the negative refractive power.

If the voltage is applied between the first and second electrodes 25A and 26B, the curvature of the interface IF decreases. If a constant voltage or more is applied, the interface becomes a plane, as shown in FIGS. 6A to 6C. FIG. 6A shows the case in which the potential (V1) of the first electrode 25A and the potential (V2) of the second electrode 26B are equal to each other (V1=V2). In this case, both the contact angles θ1 and θ2 become right angles (90°). At this time, incident light that is incident on the liquid optical element 20 and is passed through the interface IF is emitted from the liquid optical element 20, without receiving an optical action such as convergence, divergence, or deflection at the interface IF.

When the potential V1 and the potential V2 are different from each other (V1≠V2), as shown in FIGS. 6B and 6C, the interface becomes a plane inclined to the X axis and the Z axis (surface parallel to the Y axis) (θ1≠θ2). Specifically, when the potential V1 is higher than the potential V2 (V1>V2), as shown in FIG. 6B, the contact angle θ1 becomes greater than the contact angle θ2 (θ1>θ2). In contrast, when the potential V2 is higher than the potential V1 (V1<V2), as shown in FIG. 6C, the contact angle θ2 becomes greater than the contact angle θ1 (θ1<θ2). In this case (V1≠V2), incident light that advances in parallel to the first and second electrodes 25A and 26B and is incident on the liquid optical element 20 is refracted in an XZ plane at the interface IF and is deflected. Therefore, the incident light can be deflected in a predetermined direction in the XZ plane by adjusting the magnitudes of the potentials V1 and V2.

It is inferred that the phenomenon (changes in the contact angles θ1 and θ2 by application of the voltage) described above is generated as follows. That is, charges are accumulated in the inner surfaces 28A and 28B by applying the voltage and the polar liquid 29P having the polarity is drawn to the insulating film 28 by the Coulomb force of the charges. A contact area between the polar liquid 29P and the inner surfaces 28A and 28B increases and the non-polar liquid 29N is moved (deformed) to be excluded from a contact portion of the non-polar liquid 29N and the inner surfaces 28A and 28B by the polar liquid 29P. As a result, the interface IF becomes similar to a plane.

The curvature of the interface IF is changed by adjusting the magnitudes of the potentials V1 and V2. For example, if the potentials V1 and V2 (V1=V2) are set to be lower than the potential Vmax when the interface IF becomes a horizontal surface, as shown in FIG. 7A, an interface $IF_1$ (shown by a solid line) that has the curvature smaller than the curvature of an interface $IF_0$ (shown by a broken line) when the potentials V1 and V2 are zero is obtained. For this reason, the refractive power that is shown with respect to the light transmitted through the interface IF can be adjusted by changing the magnitudes of the potentials V1 and V2. That is, the liquid optical element 20 functions as a variable focusing lens. In this state, if the potentials V1 and V2 become different from each other (V1≠V2), the interface IF is inclined with the appropriate curvature. For example, when the potential V1 is higher than the potential V2 (V1>V2), an interface IFa that is shown by a solid line in FIG. 7B is formed. Meanwhile, when the potential V2 is higher than the potential V1 (V1<V2), an interface IFb that is shown by a broken line in FIG. 7B is formed. Therefore, by adjusting the magnitudes of the potentials V1 and V2, the liquid optical element 20 can deflect the incident light in a predetermined direction while showing the appropriate refractive power with respect to the incident light. In FIGS. 7A and 7B, in the case in which the non-polar liquid 29N has the refractive index more than the refractive index of the polar liquid 29P and the liquid optical element 20 shows the negative refractive power, the changes in the incident light when the interfaces $IF_1$ and $IF_a$ are formed are shown.

Next, a method of manufacturing the wave front converting/deflecting unit 2 will be described with reference to a perspective view shown in FIG. 8 and schematic cross-sectional views shown in FIGS. 9 to 14. FIGS. 9 to 14 are cross-sectional views in the XZ plane.

Figure 8:
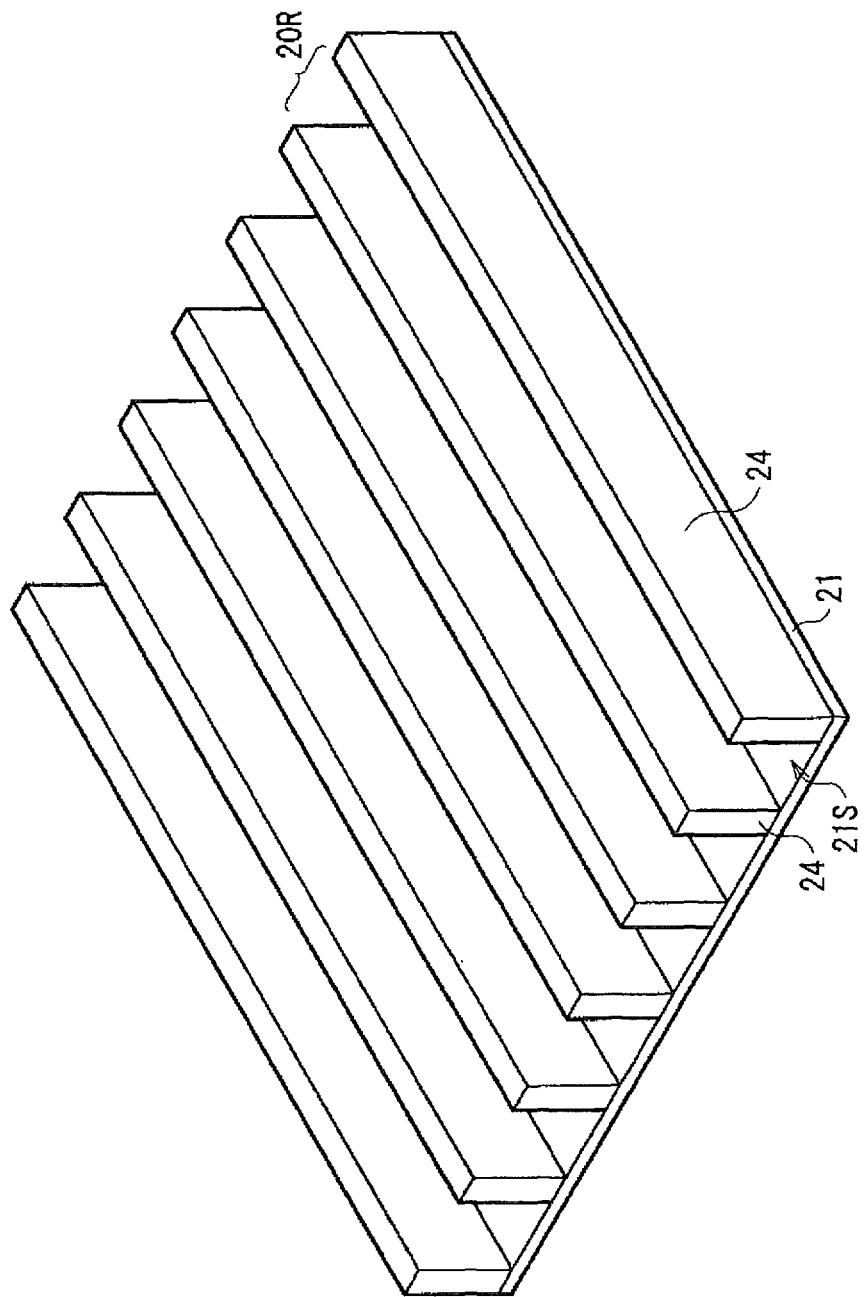
FIG. 8 is a perspective view showing one process of a method of manufacturing a wave front converting unit shown in FIG. 1.

First, after the planar substrate 21 is prepared, the plurality of partition walls 24 are formed at predetermined positions on one surface (surface 21S) of the planar substrate, as shown in FIG. 8. Thereby, the plurality of element regions 20R that are partitioned by the partition walls 24 are formed. Specifically, after the predetermined resin is applied onto the inner surface 21S by the spin coating method such that the thickness is almost uniform, the resin is patterned by performing selective exposure using a photolithographic method. Alternatively, the planar substrate 21 and the partition walls 24 that are formed of the same material and are integrated may be formed by collective molding using a mold having a predetermined shape. The planar substrate and the partition walls may be formed by injection molding, hot press molding, transfer molding using a film material, or a photoreplication process (2P) method.

Figure 9:
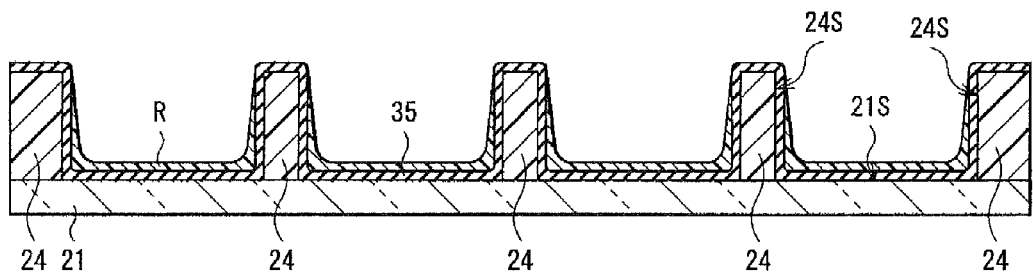
FIG. 9 is a schematic cross-sectional view showing one process following FIG. 8.

Next, as shown in FIG. 9, the insulating layer 35 made of the predetermined material is formed by a sputtering method to cover the entire region of the planar substrate 21 in which the partition walls 24 are formed. Next, a resist layer R is formed to continuously cover the wall surfaces 24S of the partition walls 24 and the surface 21S of the planar substrate 21 covered with the insulating layer 35. Specifically, after ultraviolet curable resin of a predetermined amount that dissolves in a predetermined organic solvent is dropped to the element region 20R by a dispenser and is applied by the spin coating method to be spread as a whole, the resist is cured by ultraviolet irradiation. As a material for forming the resist layer R, chemiseal U-451M (manufactured by Chemitech Inc.) is preferable.

Figure 10:
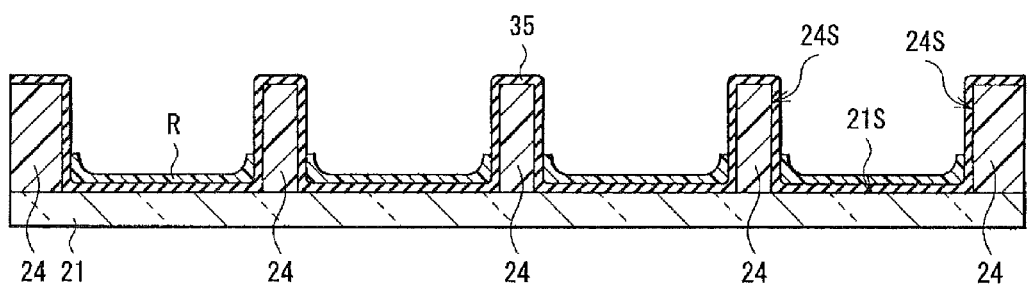
FIG. 10 is a schematic cross-sectional view showing one process following FIG. 9
Figure 11:
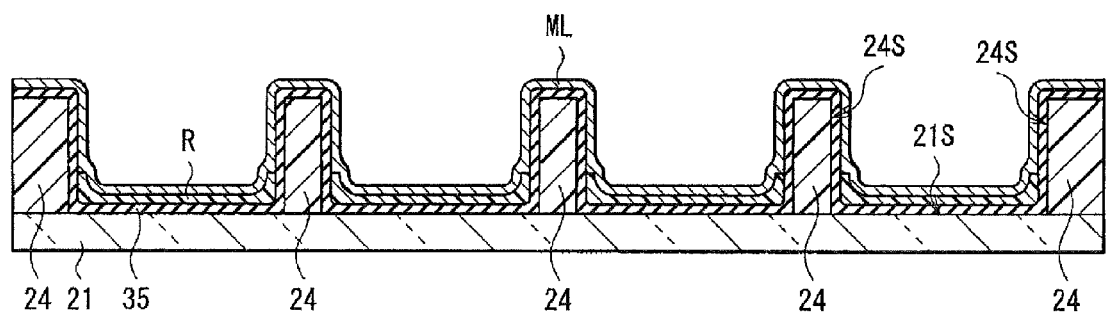
FIG. 11 is a schematic cross-sectional view showing one process following FIG. 10.

After the resist layer R is removed, as shown in FIG. 10, the resist layer R is removed by etching processing (RIE) and an upper portion of the wall surface 24S is exposed. Next, as shown in FIG. 11, a metal film ML is formed to cover the entire region. In this case, the metal film ML made of ITO is formed by a direct-current sputtering method.

Figure 12:
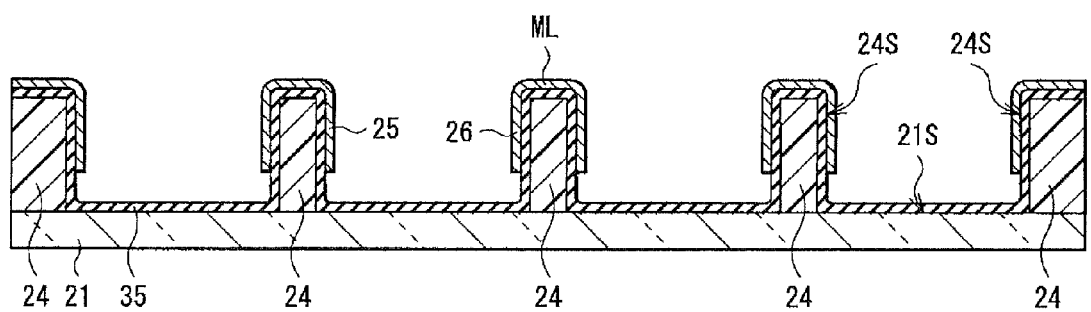
FIG. 12 is a schematic cross-sectional view showing one process following FIG. 11.
Figure 13:
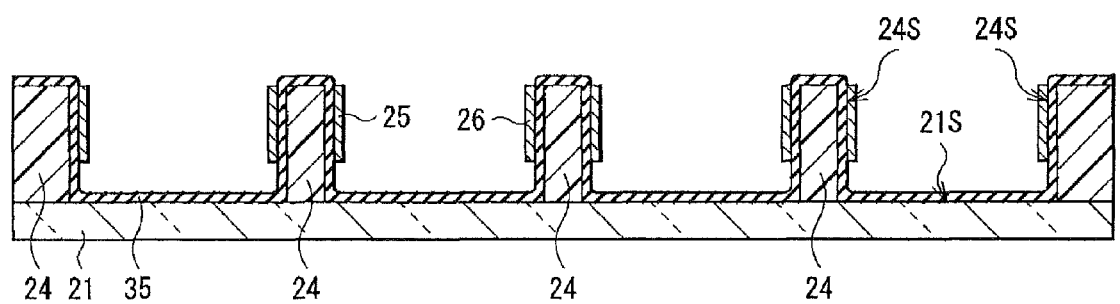
FIG. 13 is a schematic cross-sectional view showing one process following FIG. 12.

Next, the resist layer R is immersed in an organic solvent (acetone and ethyl acetate) dissolving the resist layer R and an ultrasonic vibration is applied to the resist layer R according to necessity to dissolve and remove the remaining resist layer R. At this time, as shown in FIG. 12, a part of the metal film ML that covers the resist layer R is removed. In this case, because the surface of the remaining resist layer R is roughened by damage due to collision of ions when the metal film ML is formed, the organic solvent may easily permeate the surface. After the connecting portions 34A and 34B (refer to FIGS. 2 and 3) are formed by selectively forming the metal film using a metal mask, the metal film ML that covers the upper portion of the partition wall 24 through the insulating layer 35 is removed by a chemical mechanical polishing (CMP) method. Thereby, as shown in FIG. 13, the first and second electrodes 25 and 26 that cover the portion other than the lower portion of the wall surface 24S of the partition wall 24 and are insulated from each other are formed. However, the present disclosure is not limited to the CMP method and the metal film ML may be selectively removed by simple mechanical polishing. Next, the separating portions 32 and 33 are formed by irradiating the parts of the surfaces of the first and second electrodes 25 and 26 with laser beams (refer to FIG. 2). In this case, laser beams having a short pulse width (for example, about 10 psec) may be used. If these laser beams are used, thermal diffusion is small and thermal energy given to the partition wall 24 can be suppressed. At this time, if a conductive material such as In (indium) or Sn (tin) is scattered by the laser beam irradiation, a short circuit may be generated. For this reason, when the laser beams are irradiated, attention should be given to prevent removed dust from being attached again to the separating portions 32 and 33 and the surrounding portions thereof, by the irradiation of the base beams in a vacuum state having a pressure lower than an atmospheric pressure, exhausting, and blowing gas. By forming the separating portions 32 and 33, the first electrode 25 is separated into the portion 25A and the portion 25B and the second electrode 26 is separated into the portion 26A and the portion 26B. Next, the silver paste 34H is formed by the screen printing method.

Figure 14:
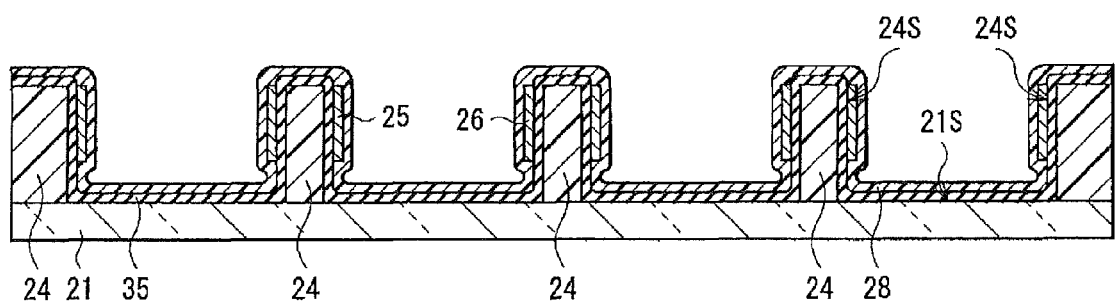
FIG. 14 is a schematic cross-sectional view showing one process following FIG. 13.

Next, the insulating film 28 is formed by a vacuum evaporation method to cover the region other than the connecting portions 34A and 34B (refer to FIG. 14). In this case, the first and second electrodes 25 and 26 are not formed on the lower portion of the wall surface 24S of the partition wall 24 and are formed to be apart from the surface of the planar substrate 21. For this reason, the portion of the insulating film 28 that covers the first and second electrodes 25 and 26 has an almost constant thickness.

Next, the non-polar liquid 29N is injected into or dropped to a space partitioned by the partition wall 24. Next, the planar substrate 22 provided with the third electrode 27 is prepared and the planar substrate 21 and the planar substrate 22 are disposed to face each other at a constant interval. At this time, the adhesive layer 31 is provided along an outer edge of the overlapped region of the planar substrate 21 and the planar substrate 22 and the planar substrate 22, the sidewall 23 and the partition wall 24 are fixed by the adhesive layer 31. An injection hole is formed in the part of the adhesive layer 31. Finally, after the polar liquid 29P is filled into the space surrounded by the planar substrate 21, the sidewall 23, the partition wall 24, and the planar substrate 22 from the injection hole, the injection hole is sealed. By the processing sequence described above, the wave front converting/deflecting unit 2 that includes the plurality of liquid optical elements 20 having superior responsiveness can be manufactured simply.

<Operation of Stereoscopic Display Device>

In the stereoscopic display device, as shown in FIG. 1, if a video signal is input to the display unit 1, the display image light I-L for the left eye is emitted from the display pixel 12L and the display image light I-R for the right eye is emitted from the display pixel 12R. The display image lights I-L and I-R are incident on the liquid optical element 20. In the liquid optical element 20, the voltage of the appropriate value is applied to the first and second electrodes 25 and 26, such that the focal distance becomes the air-converted distance of the refractive index between the display pixels 12L and 12R and the interface IF. According to the position of an observer, the focal distance of the liquid optical element 20 may be changed. By the action of the cylindrical lens formed by the interface IF of the non-polar liquid 29N and the polar liquid 29P in the liquid optical element 20, the emission angles of the display image lights I-L and I-R that are emitted from the display pixels 12L and 12R of the display unit 1 are selected. For this reason, as shown in FIG. 1, the display image light I-L is incident on a left eye 10L of the observer and the display image light I-R is incident on a right eye 10R of the observer. Thereby, the observer can observe stereoscopic video.

By setting the interface IF in the liquid optical element 20 to a flat surface (refer to FIG. 6A) and not performing the wave front conversion with respect to the display image light I-L and I-R, a high-resolution two-dimensional image can be displayed.

<Effect of Stereoscopic Display Device>

As such, in the wave front converting/deflecting unit 2 according to this embodiment, the first and second electrodes 25 and 26 are formed to be apart from the surface 21S of the planar substrate 21, such that the first and second electrodes 25 and 26 are not formed on the lower portion of the wall surface 24S of the partition wall 24. For this reason, as compared with the case in which the first and second electrodes 25 and 26 are formed to contact the surface 21S of the planar substrate 21, the change in the thickness of the portion of the insulating film 28 that covers the first and second electrodes 25 and 26 is decreased. If the first and second electrodes 25 and 26 are formed to contact the surface 21S, the following problems are generated. For example, when the insulating film 28 is formed by the sputtering method, in corner portions in which the surface 21S and the first and second electrodes 25 and 26 cross, the material for forming the insulating film 28 is seldom attached to the first and second electrodes 25 and 26. As a result, the insulating film 28 that covers the first and second electrodes 25 and 26 of the corner portions may become thin, as compared with the other portion. Therefore, in this embodiment, as described above, the first and second electrodes 25 and 26 are not formed in the corner portions in which the wall surface 24S and the surface 21S cross and the surrounding portions thereof and are formed at the positions apart from the surface 21S. For this reason, the thickness of the insulating film 28 that is attached to the surfaces of the first and second electrodes 25 and 26 can be equalized. Thereby, in each liquid optical element 20, the driving voltage can be decreased by decreasing the thickness of the insulating film 28 while a sufficient insulating property is secured and a stabilized change of the interface shape can be accurately reproduced. Therefore, according to the stereoscopic display device including the liquid optical element 20, accurate image display corresponding to the predetermined video signal can be realized while consumption power is decreased. In this embodiment, the first and second electrodes 25 and 26 in the wave front converting/deflecting unit 2 are formed without using a photolithographic method using a mask. For this reason, alignment of the mask and the partition wall 24 becomes unnecessary and errors of the arrangement position and the dimension due to the alignment can be avoided. Therefore, even when the planar substrate 21 and the partition walls 24 are formed of resin having the large dimension change due to the temperature change, the liquid optical element 20 can be formed with high dimension accuracy.

In the wave front converting/deflecting unit 2 according to this embodiment, the connecting portions 34A and 34B are formed to cover the surface 21S of the planar substrate 21 that becomes a bottom surface of each element region 20R. Thereby, connection with a conductive wire to obtain conduction with an external power supply can be facilitated. In this case, because the first and second electrodes 25 and 26 are reliably separated into the two portions by the separating portions 32 and 33, respectively, electric insulation of the two facing electrodes (first and second electrodes 25A and 26B) in the valid region 20Z can be reliably performed. That is, each potential of the first and second electrodes 25A and 26B can be controlled independently.

<Application Example (Electronic Apparatus) of Display Device>

Next, the application example of the display device will be described.

The display device of the present disclosure is applicable to electronic apparatuses for various purposes and kinds of the electronic apparatuses are not limited in particular. The display device can be mounted to the following electronic apparatus. However, a configuration of the electronic apparatus to be described below is only exemplary and the configuration can be appropriately changed.

Figure 15:
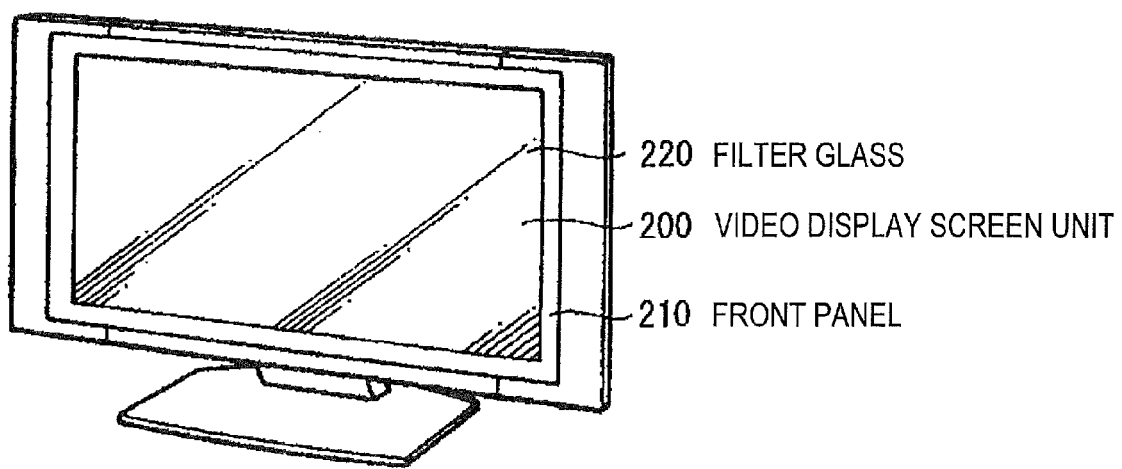
FIG. 15 is a perspective view showing a configuration of a television apparatus corresponding to an electronic apparatus using a display device.

FIG. 15 shows an external configuration of a television apparatus. The television apparatus includes a video display screen unit 200 as the display device. The video display screen unit 200 includes a front panel 210 and a filter glass 220.

The display device of the present disclosure can be used as a video display portion in a tablet personal computer (PC), a notebook PC, a mobile phone, a digital still camera, a video camera, or a car navigation system, in addition to the television apparatus shown in FIG. 15.

The present disclosure has been described in connection with the embodiments. However, the present disclosure is not limited to the embodiments and various modifications can be made. For example, in the embodiments described above, the liquid optical element 20 in the wave front converting/deflecting unit 2 shows both the condensing or diverging action and the deflection action. However, the wave front converting unit and the deflecting unit may be individually provided and different devices may provide the condensing or diverging action and the deflection action to the display image light.

Figure 16:
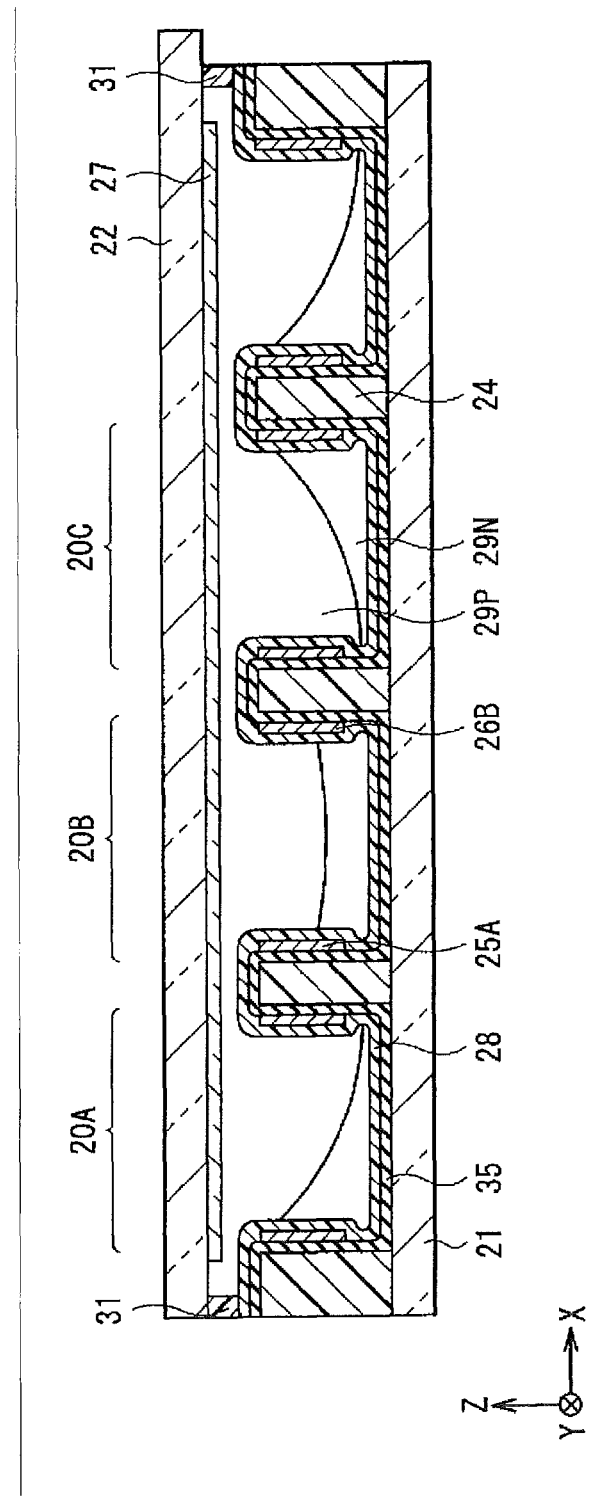
FIG. 16 is a cross-sectional view showing another use example of the wave front converting/deflecting unit shown in FIG. 1.

As shown in FIG. 16, a plurality of liquid optical elements 20 may be provided to correspond to a set of display pixels 12L and 12R and the plurality of liquid optical elements 20 may be combined to function as one cylindrical lens (Fresnel lenticular lens). FIG. 16 shows an example in which one cylindrical lens is formed by liquid optical elements 20A, 20B, and 20C.

Figure 17:
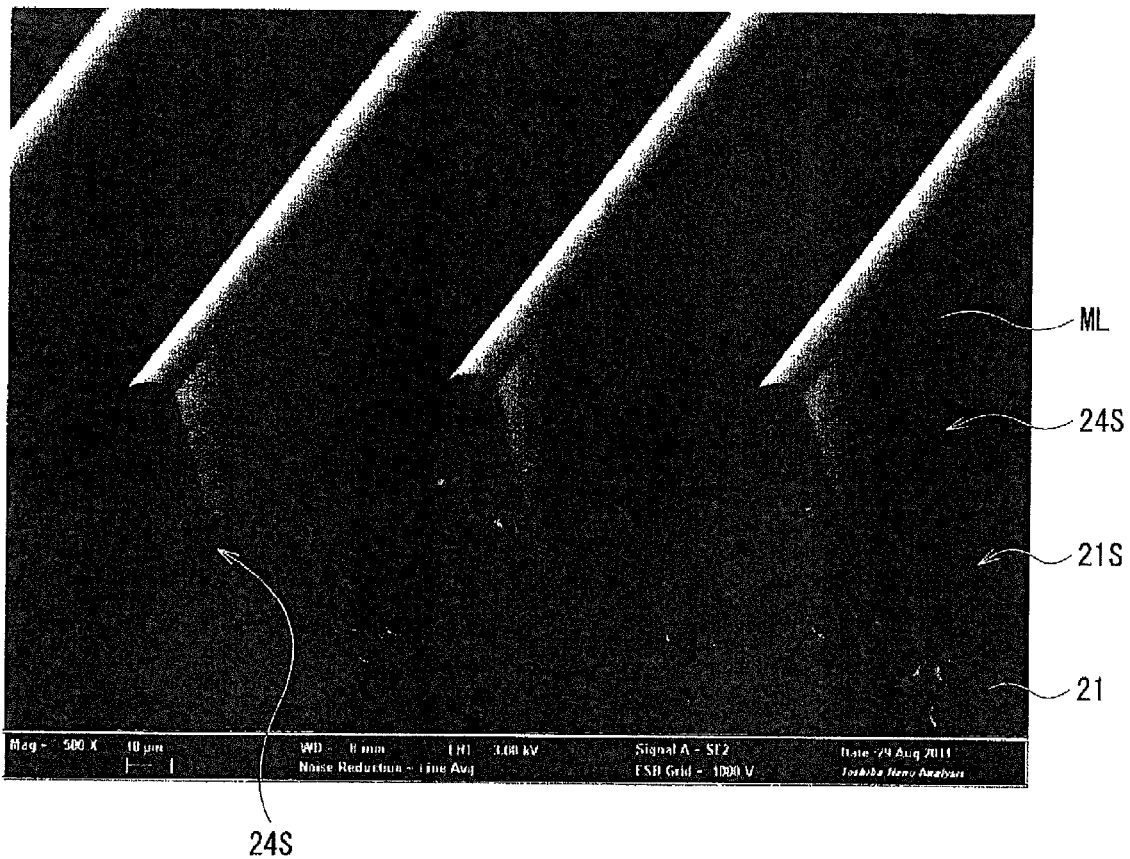
FIG. 17 is an electron microscope photograph showing a perspective configuration of a wave front converting unit according to a modification.

In the embodiments described above, the wall surface 24S of the partition wall 24 is vertical to the surface 21S of the planar substrate 21. However, in the present disclosure, like a modification shown in FIG. 17, the wall surface 24S may be a surface that is inclined to the surface 21S. FIG. 17 is an electron microscope photograph showing a perspective configuration corresponding to the part of FIG. 4. As shown in the modification, the wall surface 24S is inclined and the width of the partition wall 24 gradually decreases toward the top surface of the partition wall. Therefore, when the partition wall 24 is manufactured by molding, separation with a mold is smoothly performed and manufacturability can be improved. An inclined angle of the wall surface 24S is about 5° from a direction vertical to the surface 21S of the planar substrate 21. FIG. 17 shows a structure of a step of selectively removing the resist layer R covering the lower portion of the wall surface 24S and the surface 21S of the planar substrate 21 after the metal film ML is formed. For this reason, the metal film ML that includes the portions serving as the first and second electrodes 25 and 26 covering the upper portion of the wall surface 24S and the portion covering the top surface of the partition wall 24 is formed. In the structure shown in FIG. 17, after only oxygen gas is introduced at 50 sccm, the RIE is performed for 15 minutes under the pressure of 20 Pa, and the resist layer R is selectively removed, the metal film ML made of the ITO is formed to the thickness of about 300 nm, by the DC sputtering method. The sputtering is carried out using a target of the ITO including $SnO_2$ at 5 wt %, at a power of 300 W, an argon gas flow rate of 19.6 sccm, an oxygen gas flow rate of 0.4 sccm, and a pressure of mixed gas of 0.3 Pa.

In the embodiments described above, the color liquid crystal display that uses the backlight as the two-dimensional image generating unit (display unit) has been described. However, the present disclosure is not limited thereto. For example, a display using an organic EL element or a plasma display may be used.

The liquid optical element of the present disclosure is not limited to the stereoscopic display device and is applicable to various devices in which an optical action should be performed.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:
1. An optical element comprising:
a first substrate;
a pair of wall portions disposed on the first substrate;
first and second electrodes disposed on wall surfaces of the pair of wall portions to face each other;
an insulating film disposed on the first and second electrodes;
a protective layer disposed between the wall surfaces of the wall portions and the first and second electrodes;
a first separating portion that separates the first electrode into two portions; and
a second separating portion that separates the second electrode into two portions.
2. The optical element according to claim 1,
wherein the first separating portion is provided on one end of the wall portions in the second direction, and
the second separating portion is provided on the other end of the wall portions in the second direction.
3. The optical element according to claim 1,
wherein the first and second separating portions are recess portions that are formed by laser beam irradiation.
4. The optical element according to claim 3,
wherein the recess portions are continuous from the wall portions to the first substrate.
5. The optical element according to claim 1,
wherein the protective layer includes at least one of silicon oxide (SiOx), silicon nitride (SiOxNy), aluminum oxide (Al2O3), and tantalum oxide (Ta2O5).
6. A method of forming an optical element comprising:
forming a pair of wall portions erected to be adjacent to each other in a first direction and extending in a second direction different from the first direction, on a surface of a first substrate;
forming a protective layer to cover wall surfaces of the wall portions;
forming a resist layer to continuously cover the protective layer and a surface of the first substrate;
selectively removing a portion covering a region apart from the surface of the first substrate, of the resist layer covering the wall surfaces of the wall portions;
removing the other portion of the remaining resist layer after forming facing first and second electrodes to cover regions in which the resist layer is removed in the wall surfaces of the wall portions;
forming an insulating film to cover the first and second electrodes;
arranging a second substrate of which one surface is provided with a third electrode, such that the third electrode faces the first substrate; and
sealing a polar liquid and a non-polar liquid having different refractive indexes, between the first substrate and the second substrate.
7. The method according to claim 6,
wherein the protective layer is formed of at least one of silicon oxide (SiOx), silicon nitride (SiOxNy), aluminum oxide (Al2O3), and tantalum oxide (Ta2O5).
8. The method according to claim 6,
wherein the first substrate and the wall portions are integrally formed using resin.
9. The method according to claim 6,
wherein the resist layer is formed by applying an ultraviolet curable resist to continuously cover the wall surfaces of the wall portions and the surface of the first substrate and curing the ultraviolet curable resist by ultraviolet irradiation and heat treatment, and
the electrodes are formed by a sputtering method.
10. The method according to claim 9,
wherein the other portion of the resist layer is dissolved and removed by an organic solvent.
11. The method according to claim 6,
wherein a portion covering a region apart from the surface of the first substrate, of the resist layer, is selectively removed by a reactive ion etching (RIE) method.
12. The method according to claim 6,
wherein recess portions that divide the first and second electrodes are formed by irradiating parts of the surfaces of the first and second electrodes with laser beams.
13. The optical element according to claim 1, further comprising:
a second substrate disposed to face the first substrate;
a third electrode provided on an inner surface of the second substrate facing the first substrate; and
a polar liquid and a non-polar liquid disposed between the first substrate and the second substrate,
wherein the pair of wall portions is disposed on the first substrate to be adjacent to each other in a first direction and extend in a second direction different from the first direction.

14. The optical element according to claim 13, wherein a refractive index of the polar liquid is different than a refractive index of the non-polar liquid.

\* \* \* \* \*